United States Patent [19]

Fischer et al.

[11] Patent Number: 5,639,839

[45] Date of Patent: Jun. 17, 1997

[54] OLIGOMERS AND POLYMERS OF AMINOALKENES

[75] Inventors: David Fischer, Gönnheim; Franz Langhauser, Bad Dürkheim; Jürgen Kerth, Carlsberg; Günther Schweier, Friedelsheim; Rolf Muelhaupt; Martin Schneider, both of Freiburg, all of Germany

[73] Assignee: BASF Aktiengesellschaft, Ludwigshafen, Germany

[21] Appl. No.: 529,971

[22] Filed: Sep. 19, 1995

[30] Foreign Application Priority Data

Sep. 20, 1994 [DE] Germany ............... 44 33 481.8

[51] Int. Cl.[6] .................. C08F 230/08; C08F 4/642
[52] U.S. Cl. ................. 526/279; 526/127; 526/943; 525/326.5; 525/328.2
[58] Field of Search ............... 526/279, 943, 526/127; 525/326.5, 328.2

[56] References Cited

U.S. PATENT DOCUMENTS

| | | | |
|---|---|---|---|
| 3,476,726 | 11/1969 | Giannini et al. | 526/310 |
| 4,255,548 | 3/1981 | Wingard, Jr. et al. | 526/310 |
| 4,623,699 | 11/1986 | Brunnmueller et al. | 525/355 |
| 4,952,656 | 8/1990 | Lai et al. | 525/328.2 |
| 5,239,022 | 8/1993 | Winter et al. | 526/127 |
| 5,248,737 | 9/1993 | Sivak et al. | 525/384 |
| 5,312,881 | 5/1994 | Marks et al. | 526/126 |

FOREIGN PATENT DOCUMENTS 423 438  4/1991  European Pat. Off. .

OTHER PUBLICATIONS

H–J Sinn et al (1980) Adv. Organomet Chem 18, 99, 140–3.

*Primary Examiner*—Mark Nagumo
*Attorney, Agent, or Firm*—Keil & Weinkauf

[57] ABSTRACT

Oligomers and polymers, obtainable from
A) from 0.001 to 100 mol % of at least one aminoalkene of the general formula I

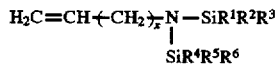

where
X is an integer from 0 to 25 and
$R^1$ to $R^6$ are hydrogen, $C_1$- to $C_{10}$-alkyl, 5- to 7-membered cycloalkyl which, in turn, can carry $C_1$- to $C_6$-alkyl groups as substituents or $C_6$- to $C_{15}$-aryl and
B) from 0 to 99.999 mol % of at least one alkene, for x=1 in formula I propene being excluded as component B).

4 Claims, No Drawings

OLIGOMERS AND POLYMERS OF AMINOALKENES

The present invention relates to oligomers and polymers, obtained from
A) from 0.001 to 100 mol % of at least one aminoalkene of the formula I

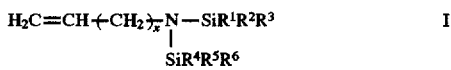

where
X is an integer from 0 to 25 and
$R^1$ to $R^6$ are hydrogen, $C_1$- to $C_{10}$-alkyl, 5- to 7-membered cycloalkyl which, in turn, can carry $C_1$- to $C_6$-alkyl groups as substituents or $C_6$- to $C_{15}$-aryl and
B) from 0 to 99.999 mol % of at least one alkene,
for x=1 in formula I propene being excluded as component B).

The present invention furthermore relates to processes for preparing oligomers and polymers of this type and their use for preparing further nitrogen-containing polymers.

In many applications of polyolefins their low polarity causes difficulties. This particularly applies if a good surface adhesion is desired, eg. in the gluing or in the coating of workpieces based on polyolefin. The poor phase binding in polyolefin blends with polar polymers, eg. polyamide, is also critical. To overcome these difficulties, polyolefin materials are frequently subjected to polar modification, ie. polar groups are introduced by means of suitable surface treatment (eg. by flaming) or for example by reactive extrusion (eg. grafting with MSA). These polar groups which are chemically bonded to the polyolefin matrix improve the interaction with polar materials and thus also the interfacial adhesion.

It is common to the various starting points for preparing polar-modified polyolefin materials that a laborious reprocessing step is necessary. Additionally, the distribution of the reactive groups in the aftertreated polymer is very inhomogeneous and can only be poorly controlled due to the process.

In U.S. Pat. No. 3,476,726, a copolymer of a 1-olefin with a dialkyl-ω-alkyleneamine, which can be prepared using a normal, heterogeneous Ziegler-Natta catalyst, is described. However, the polarity here of the amino group introduced is distinctly lowered by sterically demanding alkyl substituents. Elimination of these substituents with formation of primary amino groups is not possible here.

EP-A 423 438 describes the copolymerization of propene with allylbis(trimethylsilyl)amine and diallyltrimethylsilylamine. This is also carried out using a conventional Ziegler-Natta catalyst. In contrast to the copolymers described in U.S. Pat. No. 3,476,726, the trialkylsilyl protective groups are easily removed sovolytically such that polyolefin materials containing free, primary amino groups are obtained.

A disadvantage in the process described in EP-A 423 438 is the use of a conventional heterogeneous Ziegler-Natta catalyst, as this only permits a limited control of the molecular weight distribution and of the comonomer distribution.

It is an object of the present invention to make available polymers having functional groups, it being intended for the functional groups introduced to be distributed as uniformly as possible along the polymer chain. Furthermore, the protected functional groups should allow simple removal of the protective groups and the molecualr weight distribution of the polymers should be narrow.

We have found that this object is achieved by the oligomers and polymers defined at the beginning.

We have furthermore found processes for preparing oligomers and polymers of this type and their use for preparing further nitrogen-containing polymers.

To prepare the oligomers and polymers according to the invention, the component A) employed is from 0.001 to 100 mol %, preferably from 1 to 30 mol %, of an aminoalkene of the general formula I, where x is preferably an integer from 1 to 18, in particular from 2 to 15 and $R^1$ to $R^6$ are preferably linear or branched $C_1$- to $C_{10}$-alkyl groups, in particular $C_1$- to $C_6$-alkyl groups. Preferred compounds of the general formula I are those where the two silyl radicals —$SiR^1R^2R^3$ and —$SiR^4R^5R^6$ are identical. It is particularly preferred if the radicals $R^1$, $R^2$ and $R^3$ and also $R^4$, $R^5$ and $R^6$ also have the same meaning, in particular methyl.

Different aminoalkenes can also be employed as component A).

The preparation of the aminoalkenes of the general formula I is known per se. Thus, for example, starting from the commercially available compounds

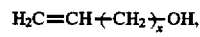

as described in the Journal of Chem. Soc. 65 (1943), 1075–1080, the corresponding chlorine compound

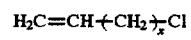

can be prepared and this can be reacted as in Angewandte Chemie 80 (1968), 986–996 to give

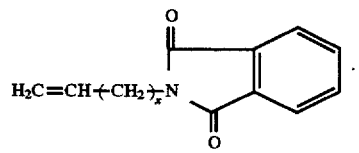

Starting from this alkenylphthalimide, as described in Synthesis 1976, 389–391, the alkenylamine

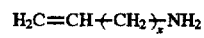

can be obtained, which can then be reacted as described in Tetrahedron Letters No. 11 (1968), 1325–1328, to give the desired aminoalkene of the general formula I.

The component B) employed is from 0 to 99.999 mol %, preferably from 70 to 99 mol %, of at least one alkene. Preferred alkenes are alk-1-enes, particularly having from 2 to 28 C atoms, preferably having from 2 to 10 C atoms, such as ethylene, propylene, butene, pentene, hexene, heptene, octene, nonene and decene. However, cycloolefins having from 4 to 10 C atoms can also be employed, for example cyclobutene and cyclopentene and also bi- and polycyclic olefins such as norbornenes.

In the preparation of the oligomers and polymers according to the invention it has proven preferable to oligomerize or polymerize the components A) and B) in the presence of a metallocene catalyst system.

Particularly suitable metallocene complexes C) can be distinguished by the following formula II:

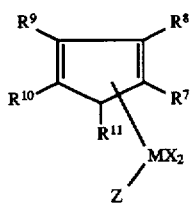

II where the substituents have the following meanings:
M is titanium, zirconium, hafnium, vanadium, niobium or tantalum,
X is fluorine, chlorine, bromine, iodine, hydrogen, $C_1$- to $C_{10}$-alkyl, $C_6$- to $C_{15}$-aryl or $-OR^{12}$,
$R^{12}$ being $C_1$- to $C_{10}$-alkyl, $C_6$- to $C_{15}$-aryl, alkylaryl, arylalkyl, fluoroalkyl or fluoroaryl each having 1 to 10 C atoms in the alkyl radical and 6 to 20 C atoms in the aryl radical,
$R^7$ to $R^{11}$ are hydrogen, $C_1$- to $C_{10}$-alkyl, 5- to 7-membered cycloalkyl which, in turn, can carry a $C_1$- to $C_6$-alkyl as a substituent, $C_6$- to $C_{15}$-aryl or arylalkyl, it also being possible, if desired, for two adjacent radicals together also to be a cyclic group containing 4 to 15 C atoms, preferably 8 to 15 C atoms, or $Si(R^{13})_3$ where
$R^{13}$ is $C_1$- to $C_{10}$-alkyl, $C_6$- to $C_{15}$-aryl or $C_3$- to $C_{10}$-cycloalkyl,
Z is X or

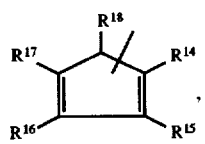

the radicals
$R^{14}$ to $R^{18}$ being hydrogen, $C_1$- to $C_{10}$-alkyl, 5- to 7-membered cycloalkyl which, in turn, can carry a $C_1$- to $C_{10}$-alkyl as a substituent, $C_6$- to $C_{15}$-aryl or arylalkyl and it being possible, if desired, for two adjacent radicals together also to be a cyclic group containing 4 to 15 C atoms, preferably 8 to 15 C atoms, or $Si(R^{19})_3$ where
$R^{19}$ is $C_1$- to $C_{10}$-alkyl, $C_6$- to $C_{15}$-aryl or $C_3$- to $C_{10}$-cycloalkyl, or the radicals
$R^{10}$ and Z together being a group $-[Y(R^{20})_2]_n-E-$, where
Y is silicon, germanium, tin or carbon,
$R^{20}$ is hydrogen, $C_1$- to $C_{10}$-alkyl, $C_3$- to $C_{10}$-cycloalkyl or $C_6$- to $C_{10}$-aryl
n is a number 1, 2, 3 or 4
E is

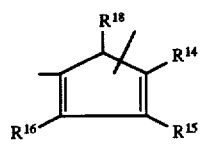

or A, A being $-O-$, $-S-$, $>NR^{21}$ or $>PR^{21}$,
where $R^{21}$ is $C_1$- to $C_{10}$-alkyl, $C_6$- to $C_{15}$-aryl, $C_3$- to $C_{10}$-cycloalkyl, alkylaryl or $Si(R^{22})_3$
where $R^{22}$ is $C_1$- to $C_{10}$-alkyl, $C_6$- to $C_{15}$-aryl, $C_3$- to $C_{10}$-cycloalkyl or alkylaryl.

Of the metallocene complexes of the formula II,

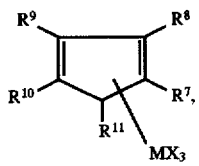

IIa

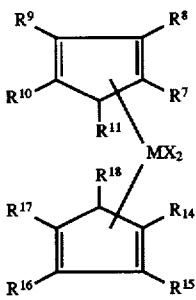

IIb

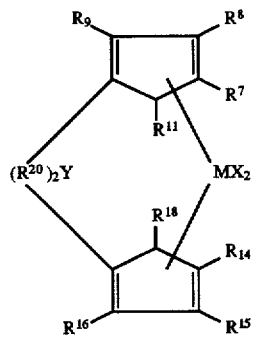

IIc and

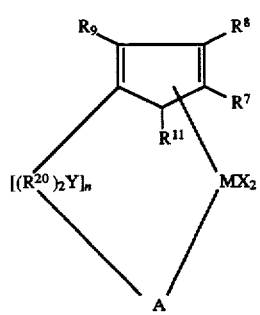

IId are preferred.

The designation metallocenes is thus understood as not only meaning the bis(η-cyclopentadienyl) metal complexes.
The radicals X can be identical or different, preferably they are identical.
Of the compounds of the formula IIa, in particular those are preferred where
M is titanium, zirconium or hafnium,
X is chlorine and
$R^7$ to $R^{11}$ are hydrogen or $C_1$- to $C_4$-alkyl.
Of the compounds of the formula IIb, those are to be mentioned as preferred where
M is titanium, zirconium or hafnium,
X is chlorine, $C_1$- to $C_4$-alkyl or phenyl,
$R^7$ to $R^{11}$ are hydrogen, $C_1$- to $C_4$-alkyl or $Si(R^{13})_3$,
$R^{14}$ to $R^{18}$ are hydrogen, $C_1$- to $C_4$-alkyl or $Si(R^{20})_3$.
In particular, the compounds of the formula IIb are suitable where the cyclopentadienyl radicals are identical.
Examples of particularly suitable compounds are, inter alia:

bis(cyclopentadienyl)zirconium dichloride,
bis(pentamethylcyclopentadienyl)zirkonium dichloride,
bis(cyclopentadienyl)diphenylzirconium,
bis(methylcyclopentadienyl)zirconium dichloride,
bis(ethylcyclopentadienyl)zirconium dichloride,
bis(n-butylcyclopentadienyl)zirconium dichloride and
bis(trimethylsilylcyclopentadienyl)zirconium dichloride and also the corresponding dimethylzirconium compounds.

Of the compounds of the formula IIc, those are particularly suitable where $R^7$ and $R^{14}$ are identical and are hydrogen or $C_1$- to $C_{10}$-alkyl groups, $R^{14}$ and $R^{18}$ are identical and are hydrogen, or a methyl, ethyl, isopropyl or tert-butyl group $R^8$, $R^9$, $R^{15}$ and $R^{16}$ have the meanings
$R^9$ and $R^{16}$: $C_1$- to $C_4$-alkyl
$R^8$ and $R^{15}$: hydrogen
or two adjacent radicals $R^8$ and $R^9$ and also $R^{15}$ and $R^{16}$ together are a cyclic group having 4 to 12 C atoms, $R^{20}$ is $C_1$- to $C_8$-alkyl, M is titanium, zirconium or hafnium, Y is silicon, germanium, tin or carbon and X is chlorine or $C_1$- to $C_4$-alkyl.

Examples of particularly suitable complex compounds are, inter alia, dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsilanediylbis(3-tert-butyl-5-methylcyclopentadienyl) zirconium dichloride,
dimethylsilanediylbis(3-tert-butyl-5-ethylcyclopentadienyl) zirconium dichloride,
dimethylsilanediylbis(3-tert-butyl-5-methylcyclopentadienyl) dimethylzirconium,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl) zirconium dichloride,
dimethylsilanediylbis(3-ethyl-5-isopropylcyclopentadienyl) zirconium dichloride,
dimethylsilanediylbis(2-methylindenyl)zirconium dichloride,
dimethylsilanediylbis(2-methylbenzindenyl)zirconium dichloride and dimethylsilanediylbis(2-methylindenyl) hafnium dichloride.

In the compounds of the general formula IId, those are to be mentioned as particularly suitable where M is titanium or zirconium, X is chlorine or $C_1$- to $C_{10}$-alkyl, Y is silicon or carbon if n=1 or carbon if n=2

$R^{20}$ is $C_1$- to $C_8$-alkyl, $C_5$- or $C_6$-cycloalkyl or $C_6$- to $C_{10}$-aryl, A is —O—, —S—, >$NR^{21}$ and $R^7$ to $R^9$ and $R^{11}$ are hydrogen, $C_1$- to $C_{10}$-alkyl, $C_3$- to $C_{10}$-cycloalkyl, $C_6$- to $C_{15}$-aryl or $Si(R^{13})_3$, or two adjacent radicals are a cyclic group having 4 to 12 C atoms.

Particularly preferred metallocene complexes of the general formula II are those where at least one of the radicals $R^7$ to $R^{11}$ is other than hydrogen. Compounds of the formula IIc are preferably employed, in particular dimethylsilanediyl-bis(2-methylindenyl)zirconium dichloride and dimethylsilanediyl-bisindenylzirconium dichloride.

The synthesis of complex compounds of this type can be carried out by methods known per se, the reaction of the appropriately substituted, cyclic hydrocarbon anions with halides of titanium, zirconium, hafnium, vanadium, niobium or tantalum being preferred.

Examples of appropriate preparation processes are described, inter alia, in the Journal of Organometallic Chemistry, 369 (1989), 359–370.

The metallocene complex used can also be μ-oxo-bis (chloro-biscyclopentadienyl)zirconium.

As component D), the catalyst systems can additionally contain open-chain or cyclic alumoxane compounds.

Suitable open-chain or cyclic alumoxane compounds are, for example, those of the general formula III or IV

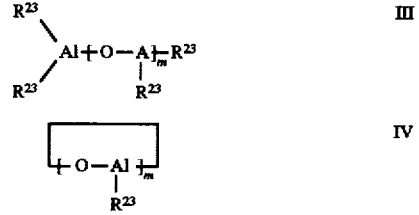

$R^{23}$ being a $C_1$- to $C_4$-alkyl group, preferably a methyl or ethyl group, and m being an integer from 5 to 30, preferably from 10 to 25.

The preparation of these oligomeric alumoxane compounds is customarily carried out by reaction of a solution of trialkylaluminum with water and is described, inter alia, in EP-A 284 708 and U.S. Pat. No. 4,794,096.

As a rule, the oligomeric alumoxane compounds obtained here are present as mixtures of both linear and cyclic chain molecules of different length, so m is to be regarded as a mean value. The alumoxane compounds can also be present in a mixture with other metal alkyls, preferably with aluminum alkyls.

It has proven advantageous to use the metallocene complexes and the oligomeric alumoxane compound in amounts such that the atomic ratio between aluminum from the oligomeric alumoxane compound and the transition metal from the metallocene complexes is in the range from 10:1 to $10^6$:1, in particular in the range from 10:1 to $10^4$:1.

Solvents employed for these catalyst systems are customarily aromatic hydrocarbons, preferably having 6 to 20 C atoms, in particular xylenes and toluene as well as mixtures thereof.

The catalyst-complexes can also be employed in supported form.

Support materials employed are preferably finely divided supports which preferably have a particle diameter in the range from 1 to 300 μm, in particular from 30 to 70 μm. Suitable support materials are, for example, silica gels, preferably those of the formula $SiO_2$, a $Al_2O_3$, where a is a number in the range from 0 to 2, preferably from 0 to 0.5; these are thus alumosilicates or silica. Products of this type are commercially available, eg. silica gel 332 from Grace. Other supports are, inter alia, finely divided polyolefins, for example finely divided polypropylene.

The oligomers and polymers according to the invention can be prepared either batchwise or preferably continuously in the reactors customarily used for the oligomerization or polymerization of alkenes. Suitable reactors are, inter alia, tubular rectors, continuously operated loop reactors or stirring vessels, it also being possible, if desired, to use a series of several stirring vessels connected one after the other.

The oligomerization or polymerization conditions are not critical per se. Pressures from 0.5 to 3000 bar, preferably from 1 to 100 bar, and temperatures from −50° C. to +300° C., preferably from 0 to 150° C., have proven suitable.

The oligomerizations and polymerizations can be carried out in the gas phase, in a suspension, in liquid monomers and in inert solvents. Suitable suspensions or solvents are hydrocarbons, preferably $C_4$- to $C_{10}$-alkanes. Oligomers and polymers having good application properties are also obtainable in the gas phase, in a suspension and in liquid monomers.

The mean molecular weight of the oligomers or polymers formed can be controlled using the methods customary in polymerization technology, for example by addition of regulators such as hydrogen, or by changing the reaction temperatures. By lowering the reaction temperature oligomers or polymers having increased mean molecular weights can be prepared.

When working up the oligomers and polymers, for example by precipitation in hydrochloric acid-containing methanol, a simple removal of the protective groups takes place, so the products contain primary amino groups.

The oligomers and polymers according to the invention are particularly suitable for preparing further nitrogen-containing polymers. The application range is very large, thus, for example, polyisocyanates, polyurethanes, polyamides and polyureas can be prepared.

The oligomers and polymers according to the invention are distinguished by uniform incorporation of the functional groups along the polymer chain, in the case of the protected functional groups a simple hydrolytic removal of the protective groups takes place during working up and the molecular weight distribution of the oligomers and polymers is narrow.

EXAMPLES

Example 1: Polymer of 1-bis(trimethylsilyl) aminoundec-10-ene and propene 4.4 ml ( $\triangleq$ 11 mmol $\triangleq$ 27.9 mol %) of 1-bis (trimethylsilyl)amino-undec-10-ene were initially introduced into a steel autoclave in 80 ml of abs. toluene. After addition of 20 ml of 10% strength by weight of a methylalumoxane solution in toluene (Witco), propene was injected up to a total pressure of 0.7 bar ( $\triangleq$ 72.1 mol % of propene, solubility of propene at 0.7 bar and 40° C.: 0.2735 mol/l). The polymerization was started by addition of a solution of 2.32 mg ( $\triangleq$ 4 μmol) of rac-dimethylsilanediylbis(2-methyl-benzindenyl)zirconium dichloride in 4 ml of toluene. The temperature was kept constant at 40° C. After 4 hours, the polymerization was ended by releasing the pressure in the autoclave. The product was precipitated in methanol.

Working up yielded 13 g of copolymer having a mean molecular weight $M_n$ (numerical mean value) of 8446 g/mol (determined by gel permeation chromatography), $M_w$: $M_n$ of 2.56 and a melting point of 137.6° C., which indicates that the copolymer is at least partially crystalline. $^{13}$C-NMR measurements gave a comonomer content (1-bis (trimethylsilyl)aminoundec-10-ene incorporation) of 2.3 mol %. The NMR measurements no longer showed trialkylsilyl groups.

Elemental analysis: found: 83.87 C14.3 H 0.88 N

Example 2: Polymer of 1-bis(trimethylsilyl) aminoundec-10-ene and oct-1-ene 5 ml ( $\triangleq$ 13 mmol $\triangleq$ 26.5 mol %) of 1-bis (trimethylsilyl)amino-undec-10-ene were initially introduced into a steel autoclave in 80 ml of abs. toluene. After addition of 10 ml of 10% strength by weight of a methylalumoxane solution in toluene (Witco), 5 ml ( $\triangleq$ 0.036 mol) of oct-1-ene were added ( $\triangleq$ 73.5 mol % of oct-1-ene). The reaction was started by addition of a solution of 4.15 mg ( $\triangleq$ 9.2 μmol) of dimethylsilanediylbisindenylzirconium dichloride in 4 ml of toluene. The temperature was kept constant at 40° C. The polymerization was ended after 4 hours.

Working up yielded 1.4 g of copolymer having a mean molecular weight $M_n$ (numerical mean value) of 1160 g/mol (determined by $^1$H-NMR spectroscopy). $^1$H-NMR measurements gave a comonomer content (1-bis(trimethylsilyl) aminoundec-10-ene incorporation) of 21 mol %. The NMR measurements no longer showed any trialkylsilyl groups.

Elemental analysis: Found: 78.17 C13.25 H 2.37 N

Examples 3 and 4: Preparation of polyureas 1000 mg ( $\triangleq$ 0.63 mmol of amino groups) of the copolymer carrying primary amino groups obtained in Example 1 were dissolved in 20 ml of toluene and reacted for 60 minutes at 100° C. with 62.3 mg ( $\triangleq$ 0.63 mmol) of n-butyl isocyanate (Example 3) or with 74.8 mg ( $\triangleq$ 0.63 mmol) of phenyl isocyanate (Example 4). The product was precipitated in methanol and dried under reduced pressure for 60 minutes.

Example 3

Elemental analysis: Calc.: 82.50 C 14.0 H 1.66 N Found: 82.96 C 14.1 H 1.59 N Melting point: 142.5° C., which indicates that the copolymer is at least partially crystalline.

Example 4

Elemental analysis: Calc.: 82.94 C 13.76 H 1.64 N Found: 83.63 C 13.74 H 1.56 N Melting point: 143.9° C., which indicates that the copolymer is at least partially crystalline.

The elemental analyses show the virtually quantitative reaction of the components.

We claim:

1. An oligomer or polymer, obtained from the components A) and B)

A) from 1 to 30 mol % of at least one aminoalkene of the general formula I

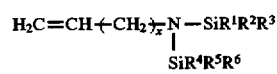   I where

X is an integer from 0 to 25 and $R^1$ to $R^6$ are hydrogen, $C_1$- to $C_{10}$-alkyl, 5- to 7-membered cycloalkyl which, in turn, can carry $C_1$- to $C_6$-alkyl groups as substituents or $C_6$- to $C_{15}$-aryl and B) from 70 to 99 mol % of at least one alkene having from 2–10 carbon atoms, for x=1 in formula I propene being excluded as component B), wherein the oligomerization or polymerization is carried out in the presence of a catalyst system which as active component contains C) a metallocene complex of the formula II

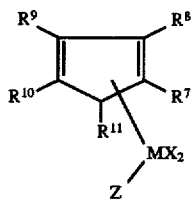

where the substituents have the following meanings:

M is titanium, zirconium, hafnium, vanadium, niobium or tantalum,

X is fluorine, chlorine, bromine, iodine, hydrogen, $C_1$- to $C_{10}$-alkyl, $C_6$- to $C_{15}$-aryl or —$OR^{12}$, $R^{12}$ being $C_1$- to $C_{10}$-alkyl, $C_6$- to $C_{15}$-aryl, alkylaryl, arylalkyl, fluoroalkyl or fluoroaryl each having 1 to 10 C atoms in the alkyl radical and 6 to 20 C atoms in the aryl radical, $R^7$ to $R^{11}$ are hydrogen, $C_1$- to $C_{10}$-alkyl, 5- to 7-membered cycloalkyl which, in turn, can carry a $C_1$- to $C_{10}$-alkyl as a substituent, $C_6$- to $C_{15}$-aryl or arylalkyl, it also being possible, if desired, for two adjacent radicals together also to be a cyclic group containing 4 to 15 C atoms, or $Si(R^{13})_3$ where $R^{13}$ is $C_1$- to $C_{10}$-alkyl, $C_6$- to $C_{15}$-aryl or $C_3$- to $C_{10}$-cycloalkyl, Z is X or

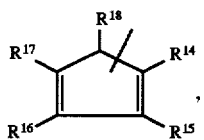

the radicals $R^{14}$ to $R^{18}$ being hydrogen, $C_1$- to $C_{10}$-alkyl, 5- to 7-membered cycloalkyl which, in turn, can carry a $C_1$- to $C_{10}$-alkyl as a substituent, $C_6$- to $C_{15}$-aryl or arylalkyl and it being possible, if desired, for two adjacent radicals together also to be a cyclic group containing 4 to 15 C atoms, or $Si(R^{19})_3$ where $R^{19}$ is $C_1$- to $C_{10}$-alkyl, $C_6$- to $C_{15}$-aryl or $C_3$- to $C_{10}$-cycloalkyl, or the radicals $R^{10}$ and Z together being a group —$[Y(R^{20})_2]_n$—E—, where Y is silicon, germanium, tin or carbon, $R^{20}$ is hydrogen, $C_1$- to $C_{10}$-alkyl, $C_3$- to $C_{10}$-cycloalkyl or $C_6$- to $C_{15}$-aryl n is a number 1, 2, 3 or 4

E is

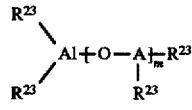

or A, A being —O—, —S—, >$NR^{21}$ or >$PR^{21}$, where $R^{21}$ is $C_1$- to $C_{10}$-alkyl, $C_6$- to $C_{15}$-aryl, $C_3$- to $C_{10}$-cycloalkyl, alkylaryl or $Si(R^{22})_3$ where $R^{22}$ is $C_1$- to $C_{10}$-alkyl, $C_6$- to $C_{15}$-aryl, $C_3$- to $C_{10}$-cycloalkyl or alkylaryl and D) a metallocene ion-forming compound.

2. An oligomer or polymer as defined in claim 1, wherein the component D) employed is an open-chain or cyclic alumoxane compound of the general formula III or IV

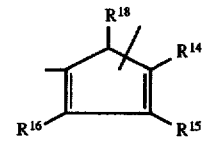

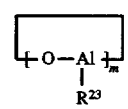

$R^{23}$ being a $C_1$- to $C_4$-alkyl group and m being an integer from 5 to 30.

3. An oligomer or polymer as defined in claim 1, wherein the component B) employed is an alk-1-ene.

4. An oligomer or polymer as defined in claim 1, which is at least partly crystalline.

* * * * *

UNITED STATES PATENT AND TRADEMARK OFFICE
CERTIFICATE OF CORRECTION

PATENT NO.: 5,639,839

DATED: June 17, 1997

INVENTOR(S): FISCHER et al.

It is certified that error appears in the above-identified patent and that said Letters Patent is hereby corrected as shown below:

Column 10, claim 2, line 31, in formula III, "Al$+$O—A$+$R$^{23}$" should be --Al$+$O—Al$+$R$^{23}$--.

Signed and Sealed this

Fifth Day of August, 1997

Attest:

BRUCE LEHMAN

*Attesting Officer*  *Commissioner of Patents and Trademarks*